(12) United States Patent
Kim et al.

(10) Patent No.: US 11,752,376 B2
(45) Date of Patent: Sep. 12, 2023

(54) FIRE EXTINGUISHING SYSTEM FOR AIR MOBILITY VEHICLE

(71) Applicants: HYUNDAI MOTOR COMPANY, Seoul (KR); KIA CORPORATION, Seoul (KR)

(72) Inventors: Jong Won Kim, Cheonan-si (KR); Youn Sic Nam, Daejeon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/825,533

(22) Filed: May 26, 2022

(65) Prior Publication Data
US 2022/0409936 A1    Dec. 29, 2022

(30) Foreign Application Priority Data
Jun. 24, 2021    (KR) .................. 10-2021-0082636

(51) Int. Cl.
A62C 3/08         (2006.01)
A62C 5/02         (2006.01)
B64D 45/00        (2006.01)

(52) U.S. Cl.
CPC .............. *A62C 3/08* (2013.01); *A62C 5/02* (2013.01); *B64D 2045/009* (2013.01)

(58) Field of Classification Search
CPC ........ A62C 3/08; A62C 5/02; B64D 2045/009
USPC .................................................. 169/16, 62
See application file for complete search history.

(56) References Cited

U.S. PATENT DOCUMENTS

| 7,028,496 B2 * | 4/2006 | Komatsu | B60H 1/3217 62/239 |
| 2023/0181956 A1 * | 6/2023 | Lee | B60H 1/3205 169/47 |

FOREIGN PATENT DOCUMENTS

KR    2011-0076070 A    7/2011

OTHER PUBLICATIONS

James M. Calm, P.E.. (1994). Refrigerant Safety ASHRAE Journal 36(7):17 26.
James M. Calm, P.E.. (1996). The Toxicity of Refrigerants Proceedings of the 1996 International Refrigeration Conference at Purdue, Purdue University, West Lafayette, IN, 157 162.

* cited by examiner

*Primary Examiner* — Christopher S Kim
(74) *Attorney, Agent, or Firm* — MCDONNELL BOEHNEN HULBERT & BERGHOFF LLP

(57) ABSTRACT

A fire extinguishing system of an air mobility vehicle includes a refrigerant flow line in which a refrigerant flows, and including a compressor, a condenser, a first expansion valve, and an evaporator, a fire extinguishing liquid flow line connected to the refrigerant flow line via a connection valve, and configured to spray a mixed liquid of a fire extinguishing liquid and the refrigerant, a mixing part connected to the fire extinguishing liquid flow line, and configured to mix the refrigerant and the fire extinguishing liquid, and a fire extinguishing liquid storage part configured to store the fire extinguishing liquid and to discharge the fire extinguishing liquid into a mixing space of the mixing part.

11 Claims, 5 Drawing Sheets

FIRE EXTINGUISHING SYSTEM FOR AIR MOBILITY VEHICLE

CROSS REFERENCE TO RELATED APPLICATIONS

The present application claims priority to Korean Patent Application No. 10-2021-0082636, filed Jun. 24, 2021, the entire contents of which is incorporated herein for all purposes by this reference.

BACKGROUND

Field

The present disclosure relates to a fire extinguishing system of an air mobility vehicle, the fire extinguishing system being configured to quickly extinguish a fire when the fire occurs in the air mobility vehicle during driving, thus protecting passengers and an airframe of the air mobility vehicle. More particularly, the present disclosure relates to a fire extinguishing system using a refrigerant of a thermal management system.

Description of the Related Art

Air mobility is the next generation of transportation, and urban air mobility (UAM) is currently being actively developed as a means of transportation that can transport people and cargo over a city.

With development of battery and motor technology, an air mobility powered by electricity rather than an internal combustion engine is expected to be eco-friendly and to relieve traffic congestion in the city.

However, an air mobility in which a lithium secondary battery is used may catch on fire due to a malfunction of high-voltage battery, lithium precipitation, and short circuit due to penetration of precipitated lithium through a separating layer, and there are other safety problems.

Conventionally, if a fire occurs in air mobility, the fire is extinguished using a fire extinguisher provided in the air mobility, or using a fire extinguishing equipment provided in a ground facility after landing on the ground. However, the general fire extinguisher may not have sufficient fire extinguishing capability, and it is difficult to ensure sufficient time for passengers to evacuate because it may take a long time for the air mobility to land on the ground.

The above problem is due to the absence of its own fire extinguishing system for an engine, parts, and the interior of air mobility, so a fire extinguishing system of an air mobility vehicle is required to solve the above problem.

The foregoing is intended merely to aid in the understanding of the background of the present disclosure, and is not intended to mean that the present disclosure falls within the purview of the related art that is already known to those skilled in the art.

SUMMARY

The present disclosure is proposed to quickly extinguish a fire occurring in an air mobility vehicle so as to protect passengers and an airframe of the air mobility vehicle.

The present disclosure is intended to provide a fire extinguishing system of an air mobility vehicle, the fire extinguishing system including a refrigerant flow line in which a refrigerant flows, and including a compressor, a condenser, a first expansion valve, and an evaporator, a fire extinguishing liquid flow line connected to the refrigerant flow line via a connection valve, and configured to spray a mixed liquid of a fire extinguishing liquid and the refrigerant, a mixing part connected to the fire extinguishing liquid flow line, and configured to mix the refrigerant and the fire extinguishing liquid, and a fire extinguishing liquid storage part configured to store the fire extinguishing liquid and to discharge the fire extinguishing liquid into a mixing space of the mixing part.

In order to achieve the above object, according to one aspect of the present disclosure, there is provided a fire extinguishing system of an air mobility vehicle, the fire extinguishing system including a refrigerant flow line in which a refrigerant may flow, and including a compressor, a condenser, a first expansion valve, and an evaporator, a fire extinguishing liquid flow line connected to the refrigerant flow line via a connection valve, and configured to spray a mixed liquid of a fire extinguishing liquid and the refrigerant, a mixing part connected to the fire extinguishing liquid flow line, and configured to mix the refrigerant and the fire extinguishing liquid, and a fire extinguishing liquid storage part configured to store the fire extinguishing liquid and to discharge the fire extinguishing liquid into a mixing space of the mixing part.

The mixing part may include a panel, an actuator having a shaft connected to an outer surface of a center portion of the panel and configured to eccentrically rotate the panel, and an opening and closing device configured to perform forward and backward reciprocating motion due to the rotation of the panel so as to open and close the fire extinguishing liquid storage part and to discharge the refrigerant to the mixing space.

The fire extinguishing liquid storage part may include a first fire extinguishing liquid reservoir receiving a first fire extinguishing liquid, and a second fire extinguishing liquid reservoir receiving a second fire extinguishing liquid, wherein the first fire extinguishing liquid and the second fire extinguishing liquid may be discharged respectively through a first fire extinguishing liquid outlet and a second fire extinguishing liquid outlet provided at the mixing part.

The opening and closing device may include a refrigerant inlet located at a panel-side first end thereof and a refrigerant outlet located at a mixing space-side second end thereof, and the refrigerant outlet may have a cross-sectional area smaller than a cross-sectional area of the refrigerant inlet.

The mixing space may have a protrusion to generate a vortex.

The connection valve may be a 3-way valve including one refrigerant inlet and two refrigerant outlets.

One of the refrigerant outlets facing the fire extinguishing liquid flow line may be configured to be normally closed, and a remaining one of the refrigerant outlets facing the refrigerant flow line may be configured to be closed in an event of a fire of the air mobility vehicle.

The fire extinguishing system may include: a controller configured to adjust an amount of opening of the first expansion valve, wherein the fire extinguishing liquid flow line may include a temperature sensor provided at an end thereof, the temperature sensor being configured to sense temperature of the mixed liquid of the fire extinguishing liquid and the refrigerant and to transmit a signal indicative of the temperature to the controller, and the controller may be configured to adjust the amount of opening of the first expansion valve in response to the temperature of the mixed liquid.

The refrigerant flow line may include a refrigerant reservoir configured to store the refrigerant and located at a portion thereof in rear of the condenser and in front of the first expansion valve.

When a volume of the refrigerant stored in the refrigerant reservoir is less than or equal to a predetermined reference value, a number of revolutions of the compressor may be increased.

The refrigerant flow line may include a heat pump line located at a portion thereof in rear of the compressor, the heat pump line including an inner condenser configured to air-condition an interior of the air mobility vehicle, and the refrigerant flow line may include a second expansion valve located in front of the condenser.

According to the present disclosure, the fire extinguishing system of an air mobility vehicle has an advantage in that the fire extinguishing system can mix the refrigerant of low temperature and high speed and the fire extinguishing liquid and spray the mixed liquid.

Therefore, oxygen is blocked, and components of the air mobility vehicle are cooled before being heated and reaching activation energy for pyrolysis, so that the pyrolysis of the components can be prevented, and the fire extinguishing system can quickly and efficiently respond to a fire.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

Hereinbelow, a detailed description for solving the above-described objective and problems will be described in detail with reference to the accompanying drawings. Meanwhile, in the following description of the present disclosure, detailed descriptions of known functions and components incorporated herein will be omitted when they may make the subject matter of the present disclosure unclear. The scope and spirit of the present disclosure are not limited to embodiments described hereinbelow and those skilled in the art will appreciate that various modifications, additions, and substitutions are possible.

Figure 1:
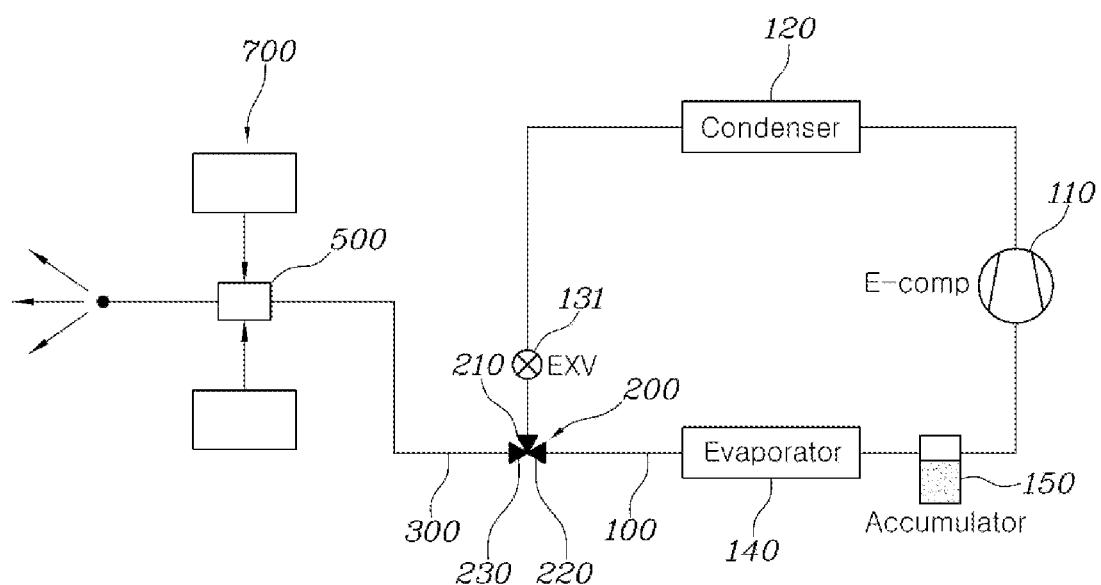
FIG. 1 is a circuit diagram of a fire extinguishing system of an air mobility vehicle according to a first embodiment of the present disclosure.
Figure 2:
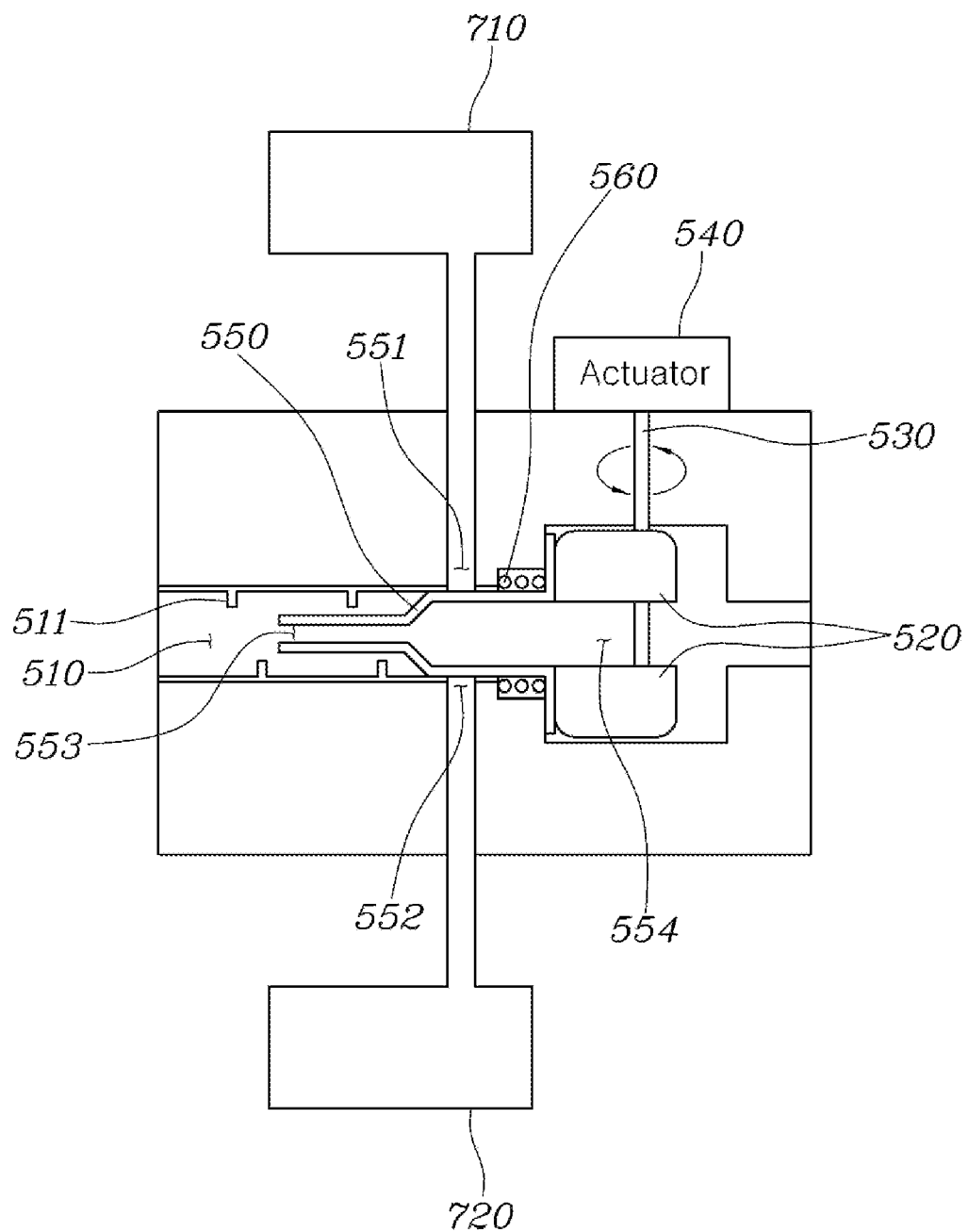
FIG. 2 is a view showing a mixing part of the fire extinguishing system of an air mobility vehicle according to the embodiment of the present disclosure.
Figure 3:
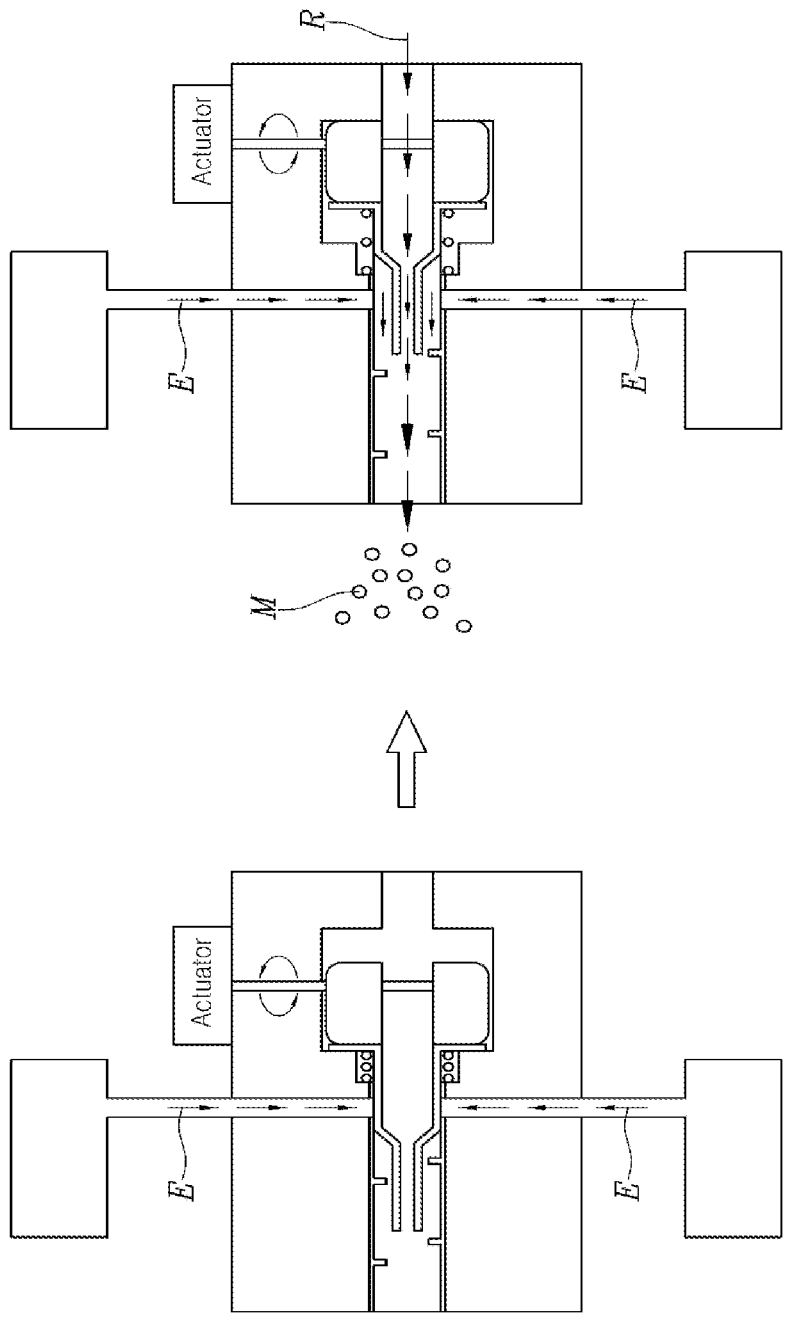
FIG. 3 is a view showing an operation of the mixing part of the fire extinguishing system of an air mobility vehicle according to the present disclosure.
Figure 4:
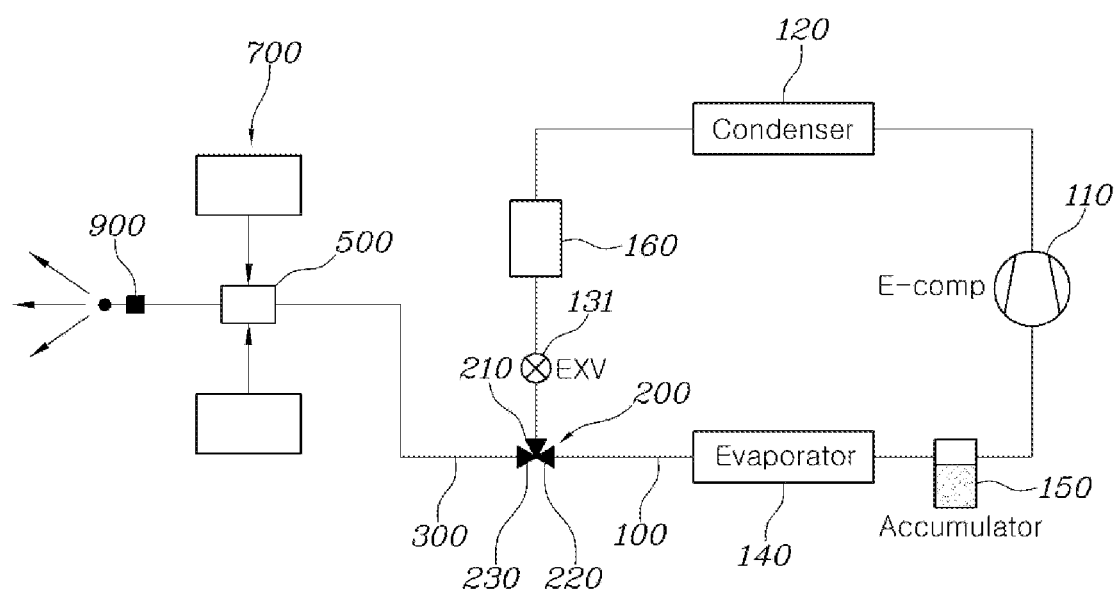
FIG. 4 is a circuit diagram of a fire extinguishing system of an air mobility vehicle according to a second embodiment of the present disclosure.
Figure 5:
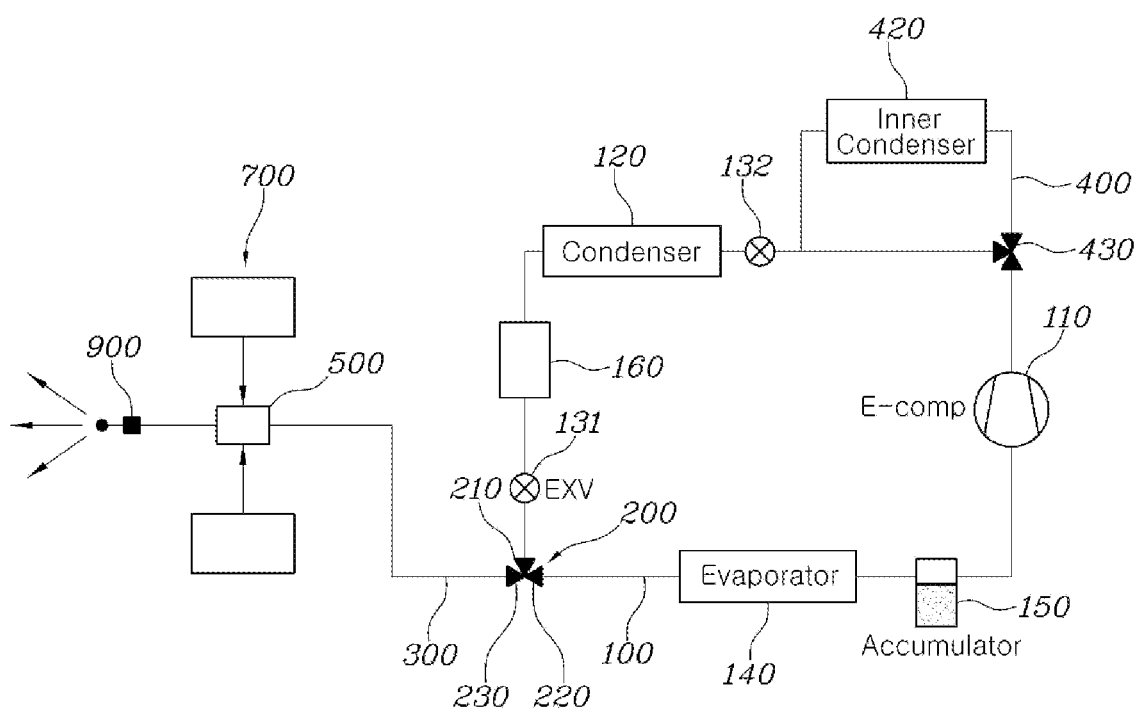
FIG. 5 is a circuit diagram of a fire extinguishing system of an air mobility vehicle according to a third embodiment of the present disclosure.

FIG. 1 is a circuit diagram of a fire extinguishing system of an air mobility vehicle according to a first embodiment of the present disclosure. FIG. 2 is a view showing a mixing part of the fire extinguishing system of an air mobility vehicle according to the embodiment of the present disclosure. FIG. 3 is a view showing an operation of mixing part of the fire extinguishing system of an air mobility vehicle according to the present disclosure. FIG. 4 is a circuit diagram of a fire extinguishing system of an air mobility vehicle according to a second embodiment of the present disclosure. FIG. 5 is a circuit diagram of a fire extinguishing system of an air mobility vehicle according to a third embodiment of the present disclosure.

Conventionally, if a fire in air mobility occurs, the fire is extinguished using a fire extinguisher provided in the air mobility, or using a fire extinguishing equipment provided in a ground facility after landing on the ground. However, the general fire extinguisher may not have sufficient fire extinguishing capability, and it is difficult to ensure sufficient time for passengers to evacuate because it may take a long time for the air mobility to land on the ground.

The fire extinguishing system of an air mobility vehicle according to the present disclosure for solving the above problems includes a refrigerant flow line 100 in which a refrigerant flows, and including a compressor 110, a condenser 120, a first expansion valve 131, and an evaporator 140, a fire extinguishing liquid flow line 300 connected to the refrigerant flow line 100 via a connection valve 200, and configured to spray a mixed liquid of a fire extinguishing liquid and the refrigerant, a mixing part 500 connected to the fire extinguishing liquid flow line 300, and configured to mix the refrigerant and the fire extinguishing liquid, and a fire extinguishing liquid storage part 700 configured to store the fire extinguishing liquid and to discharge the fire extinguishing liquid to a mixing space 510 of the mixing part 500.

FIG. 1 is the circuit diagram of the fire extinguishing system of an air mobility vehicle according to the first embodiment of the present disclosure. The fire extinguishing system of the present disclosure may have a circuit as shown in FIG. 1 in the air mobility vehicle, separately, but when the fire extinguishing system uses a thermal management system for air-conditioning the inside of the air mobility, there is an advantage that the weight of the air mobility fuselage may be reduced.

The present disclosure may be divided into the refrigerant flow line 100, the fire extinguishing liquid flow line 300, the mixing part 500, and the fire extinguishing liquid storage part 700. The refrigerant flow line 100 may be a thermal management circuit including the compressor 110, the condenser 120, the first expansion valve 131, the evaporator 140, and an accumulator 150, and air-conditioning the inside of the air mobility vehicle.

The compressor 110 compresses the refrigerant to form the gas refrigerant of high temperature and high pressure and supplies the refrigerant into the condenser 120. The condenser 120 performs heat-exchange, as an outdoor unit and the refrigerant of high temperature and high pressure are in contact with each other, to convert the gas refrigerant of high temperature and high pressure into the liquid refrigerant of high pressure. Then, the liquid refrigerant of high pressure passes through the first expansion valve 131, the liquid refrigerant of high pressure is converted into the gas or liquid refrigerant of low temperature through throttling. The evaporator 140 serves to supply cool air generated such that the refrigerant of low temperature absorbs heat from outdoor air, into the interior to air-condition the interior.

The refrigerant flow line 100 may have a refrigerant reservoir 160 provided for the gas or liquid refrigerant to be stored.

Furthermore, a heat pump line 400 and an inner condenser 420 may be provided to heat the interior.

The fire extinguishing liquid flow line 300 is a circuit for finally spraying the mixed liquid serving as an extinguishing agent. When a fire occurs in the air mobility vehicle, the refrigerant liquefied while passing through the first expansion valve 131 flows into the fire extinguishing liquid flow line 300, and the refrigerant is mixed, in the mixing part 500, with the fire extinguishing liquid discharged from the fire extinguishing liquid storage part 700 to generate the mixed liquid, and then the mixed liquid is sprayed from an end of the fire extinguishing liquid flow line 300. The liquefied refrigerant is in a state of low temperature and high pressure, so the liquefied refrigerant and the fire extinguishing liquid are mixed with each other to allow oxygen blocking by pressure and cooling and activation energy absorption by lower temperature. Therefore, the fire is quickly stopped from spreading to the surrounding area and the fire in the air mobility vehicle may be extinguished.

The refrigerant may be R-134a and R-1234yf, and the refrigerant is known as follows:
① J. M. Calm "Refrigerant Safety", ASHRAE Journal, 36(7):17-26, July 1994
② J. M Calm, "The Toxicity of Refrigerants", Proceedings of the 1996 International Refrigeration Conference at Purdue, Purdue University, West Lafayette, Ind., 157-162, July 1996, According to the above two documents, R-134a is the most non-toxic refrigerant commercially available, and it is known that the probability of human death from exposure to the refrigerant is low and the refrigerant does not pose any particular risk to humans. Additionally, R-1234yf is a refrigerant developed from R-134a, and it is known that like R-134a, the refrigerant does not pose any particular risk to humans.

Meanwhile, the mixing part 500 may include a panel 520, an actuator 540 having a shaft 530 connected to an outer surface of a center portion of the panel 520 to eccentrically rotate the panel 520, and an opening and closing device 550 performing forward and backward reciprocating motion due to the rotation of the panel 520 so as to open and close the fire extinguishing liquid storage part 700 and to discharge the refrigerant into the mixing space 510.

FIG. 2 is the view showing the mixing part of the fire extinguishing system of an air mobility vehicle according to the embodiment of the present disclosure. FIG. 3 is the view showing the operation of the mixing part of the fire extinguishing system of an air mobility vehicle according to the present disclosure.

Describing a process of mixing the fire extinguishing liquid E and the refrigerant R and spraying the mixed liquid in reference to FIGS. 2 and 3, the actuator 540 and the shaft 530 of the mixing part 500 may be connected to an outer portion of a central shaft of the panel 520 to eccentrically rotate the panel 520. Then, while an elastic member 560 such as a spring provided around the opening and closing device repeats contraction and relaxation along the eccentric rotation of the panel, the fire extinguishing liquid E is discharged from the fire extinguishing liquid storage part 700. As shown in FIG. 3, when the elastic member 560 relaxes, the opening and closing device 550 is moved rearward so that the fire extinguishing liquid E is discharged from the fire extinguishing liquid storage part into the mixing space 510, and the discharged fire extinguishing liquid E is mixed with the refrigerant R of high pressure in the mixing space 510 of the mixing part 500 to be converted into the mixed liquid M. The mixed liquid M is in high pressure due to the refrigerant R of high pressure, and may be sprayed from an end of the fire extinguishing liquid flow line 300 to extinguish a fire in the air mobility vehicle.

Meanwhile, referring to FIGS. 2 and 3, the fire extinguishing liquid storage part 700 includes a first fire extinguishing liquid reservoir 710 in which a first fire extinguishing liquid is stored, and a second fire extinguishing liquid reservoir 720 in which a second fire extinguishing liquid is stored. The first fire extinguishing liquid and the second fire extinguishing liquid may be discharged respectively through a first fire extinguishing liquid outlet 551 and a second fire extinguishing liquid outlet 552 provided at the mixing part.

The first fire extinguishing liquid and the second fire extinguishing liquid may be suitable materials for extinguishing a fire that occur in the air mobility vehicle, for example, may be a water-based extinguishing agent, a gas-based extinguishing agent, and a powder extinguishing agent.

Meanwhile, the opening and closing device 550 includes a refrigerant inlet 554 located at a panel-side first end thereof, and a refrigerant outlet 553 located at a mixing space-side second end thereof. The refrigerant outlet 553 may have a cross-sectional area smaller than a cross-sectional area of the refrigerant inlet 554.

Referring to FIGS. 2 and 3, when the refrigerant R of high pressure passes through the refrigerant outlet 553 of relatively small cross-sectional area, the refrigerant R of high pressure speeds up and increases in pressure according to Bernoulli's principle, so the refrigerant R passes through the refrigerant outlet 553 with a greater pressure than at the refrigerant inlet 554.

The mixing space 510 may have a protrusion 511. The refrigerant R of high pressure generates a vortex while passing through the protrusion 511 so that the fire extinguishing liquid E may be evenly mixed. Preferably, a shape of the protrusion 511 may be a screw shape for generating a vortex.

Meanwhile, the connection valve 200 may be a 3-way valve having a refrigerant inlet 210 and two refrigerant outlets 220 and 230. When the air mobility vehicle is in a normal driving, the refrigerant outlet 230 facing the fire extinguishing liquid flow line 300 is closed, whereby the refrigerant may flow only in the refrigerant flow line 100 and air-condition the interior. When a fire occurs in the air mobility vehicle, the refrigerant outlet 220 facing the refrigerant flow line 100 is closed and the fire extinguishing liquid flow line 300 is opened, whereby the refrigerant of high pressure and liquefied while passing through the first expansion valve 131 may be discharged through the fire extinguishing liquid flow line 300 and be mixed with the fire extinguishing liquid.

The fire extinguishing system of an air mobility vehicle may include a controller (not shown) adjusting an amount of opening of the first expansion valve 131. The fire extinguishing liquid flow line 300 has a temperature sensor 900 at a first end thereof, and the temperature sensor 900 senses the temperature of the mixed liquid of the fire extinguishing liquid and the refrigerant and transmits a signal indicative of the temperature to the controller. The controller may adjust an amount of opening of the first expansion valve in response to the temperature of the mixed liquid.

Referring to FIG. 4, the temperature sensor 900 may be located at an end of the fire extinguishing liquid flow line 300 so as to sense the temperature of the mixed liquid, and may transmit the signal indicative of the temperature to the controller. When the temperature of the mixed liquid is high, the temperature of the refrigerant is reduced by increasing an amount of opening of the first expansion valve 131 so as to reduce the temperature of the mixed liquid further.

The refrigerant flow line may have the refrigerant reservoir 160 at a portion thereof in rear of the condenser and in front of the first expansion valve to store the refrigerant. The refrigerant reservoir 160 is a storage space storing the liquid refrigerant of high pressure in order to use the refrigerant when a fire occurs, and it is preferable to always store a predetermined amount of the refrigerant in the refrigerant reservoir 160 in case of emergency such as a fire. Therefore, when the amount of the refrigerant stored in the refrigerant reservoir 160 is less than a predetermined level, rotation speed of the compressor 110 may be temporarily increased to increase an amount of storage of the refrigerant.

Furthermore, the refrigerant flow line 100 may have the heat pump line 400 with the inner condenser 420 for air-conditioning the interior of the air mobility vehicle at a portion thereof in rear of the compressor 110, so that the interior of the air mobility vehicle may be heated if needed. The refrigerant flow line 100 may have a second expansion valve 132 at a portion thereof in front of the condenser 120. In this case, a 3-way valve 430 connecting the heat pump line 400 to the refrigerant flow line 100 may be provided.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

The invention claimed is:

1. A fire extinguishing system of an air mobility vehicle, the fire extinguishing system comprising:
 a refrigerant flow line in which a refrigerant flows, the refrigerant flow line comprising a compressor, a condenser, a first expansion valve, an accumulator, and an evaporator;
 a fire extinguishing liquid flow line connected to the refrigerant flow line via a connection valve, the fire extinguishing liquid flow line being configured to spray a mixed liquid of a fire extinguishing liquid and the refrigerant;
 a mixing part connected to the fire extinguishing liquid flow line, the mixing part being configured to mix the refrigerant and the fire extinguishing liquid; and
 a fire extinguishing liquid storage part configured to store the fire extinguishing liquid and to discharge the fire extinguishing liquid into a mixing space of the mixing part.

2. The fire extinguishing system of claim 1, wherein the mixing part comprises:
 a panel;
 an actuator having a shaft connected to an outer surface of a center portion of the panel, the actuator being configured to eccentrically rotate the panel; and
 an opening and closing device configured to perform forward and backward reciprocating motion due to the rotation of the panel to open and close the fire extinguishing liquid storage part and to discharge the refrigerant to the mixing space.

3. The fire extinguishing system of claim 2, wherein the fire extinguishing liquid storage part comprises:
 a first fire extinguishing liquid reservoir receiving a first fire extinguishing liquid; and
 a second fire extinguishing liquid reservoir receiving a second fire extinguishing liquid;
 wherein the first fire extinguishing liquid is discharged through a first fire extinguishing liquid outlet provided at the mixing part, and the second fire extinguishing liquid is discharged through a second fire extinguishing liquid outlet provided at the mixing part.

4. The fire extinguishing system of claim 2, wherein the opening and closing device includes a refrigerant inlet located at a panel-side first end and a refrigerant outlet located at a mixing space-side second end thereof, and the refrigerant outlet has a cross-sectional area smaller than a cross-sectional area of the refrigerant inlet.

5. The fire extinguishing system of claim 1, wherein the mixing space has a protrusion to generate a vortex.

6. The fire extinguishing system of claim 1, wherein the connection valve is a 3-way valve comprising one refrigerant inlet and two refrigerant outlets.

7. The fire extinguishing system of claim 6, wherein a first refrigerant outlet facing the fire extinguishing liquid flow line is configured to be closed, and
 a second refrigerant outlet facing the refrigerant flow line is configured to be closed in an event of a fire of the air mobility vehicle.

8. The fire extinguishing system of claim 1, further comprising:
 a controller configured to adjust an amount of opening of the first expansion valve,
 wherein the fire extinguishing liquid flow line comprises a temperature sensor provided at an end, the temperature sensor being configured to sense temperature of the mixed liquid of the fire extinguishing liquid and the refrigerant and to transmit a signal indicative of the temperature to the controller, and
 the controller is configured to adjust the amount of opening of the first expansion valve in response to the temperature of the mixed liquid.

9. The fire extinguishing system of claim 1, wherein the refrigerant flow line comprises a refrigerant reservoir configured to store the refrigerant and located at a rear of the condenser and in front of the first expansion valve.

10. The fire extinguishing system of claim 9, wherein when a volume of the refrigerant stored in the refrigerant reservoir is less than or equal to a predetermined reference value, a number of revolutions of the compressor is increased.

11. The fire extinguishing system of claim 1, wherein the refrigerant flow line comprises a heat pump line located at a rear of the compressor, the heat pump line comprising an inner condenser configured to air-condition an interior of the air mobility vehicle, and
 the refrigerant flow line comprises a second expansion valve located in front of the condenser.

* * * * *